Aug. 7, 1934. G. E. OAKLEY 1,969,319

THERMAL RELAY

Original Filed April 23, 1931

Inventor
George E. Oakley
By his Attorney
E. M. Bentley

Patented Aug. 7, 1934

1,969,319

UNITED STATES PATENT OFFICE 1,969,319

THERMAL RELAY

George E. Oakley, Albany, N. Y., assignor to Consolidated Car-Heating Company, Inc., Albany, N. Y., a corporation of New York Application April 23, 1931, Serial No. 532,340
Renewed January 20, 1934

8 Claims. (Cl. 175—320)

For a detailed description of the present form of my invention, reference may be had to the following specification and to the accompanying drawing forming a part thereof.

Figure 1:
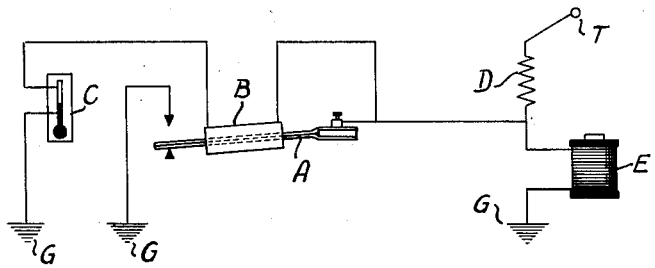

In said drawing Figure 1 is a diagrammatic view illustrating one arrangement of a thermal relay constructed in accordance with the invention. Figures 2 to 5 both inclusive are similar views respectively, illustrating various modifications.

My invention relates to the use of a thermostat to control electrical apparatus.

It is shown in the five diagrammatic figures on the drawing.

Heretofore numberless devices have been invented and patented to enable a thermostat to safely close the circuit of an electromagnet of adequate power to close a circuit, or perform some operation such as the opening or closing of a damper. My present invention eliminates the need for such devices. It consists in a thermal relay in which there is no self induction and consequently no arc at the breaking of its circuit. By my invention a thermostat can safely close and open, without arcing, as large a circuit as may be desired for the working of a damper, the control of a pump, the control of a circuit, or other work which it is desired to perform under thermostatic domination.

Referring to the drawing C represents a thermostat of the mercury type adapted to close or open an electric circuit according to the temperature. A represents the contact element of a thermal relay consisting of a bimetallic strip enclosed by an electric heater B. E represents the electromagnet to be controlled and D is a non-inductive resistance in series with E.

Normally the relay stands open as shown in the drawing, and only when heat is applied to it does its bimetallic tongue A warp up to close the circuit, and when heat is abstracted from it the tongue A warps down to open the circuit. In brief it is a heat-operated, or thermostatic relay.

In Fig. 1 we may assume that the dominated magnet E stands with its circuit normally closed, from trolley T to non-inductive resistance D to magnet E to ground. Then when the temperature at thermostat C reaches a certain high point, it will close a branch circuit through D, non-inductive heater coil B to ground. The current then passing from the trolley T to ground through the thermostat C, will energize the heater B, so that the rise in temperature will quickly cause tongue A to warp up and close a circuit to ground. This circuit, which passes through tongue A will short-circuit magnet E and cause it to drop its armature. Obviously, as the temperature changes in the vicinity of the thermostat C, the circuit will be correspondingly opened and closed and the heater B will also be alternately cut out and in, but as long as the circuit is closed through the thermostat C, the heat in the vicinity of tongue A will hold said tongue in circuit closed position, so as to maintain short-circuit around magnet E. When, however, the temperature falls at C, and the circuit breaks at that point, the heat will be cut off from the thermal relay B, tongue A will drop and remove the short circuit from E. Therefore E will again pick up its armature. In the described operation the contacts of the thermostat C will be called on to break only the small non-inductive current through heater B. This it can readily do without causing an arc at its contacts. The tongue A is only required to break the shunting circuit around E including only the non-inductive resistance D. Hence the thermal relay as well as the dominating thermostat act without an arc at their contacts. It will be observed that the heater circuit is in the form of a branch circuit including the heater B and thermostat C. Also, that it is connected to the first mentioned branch circuit at a position between the resistance D and the contact A, so that the circuit through the heater shunts said contact A.

Figure 2:
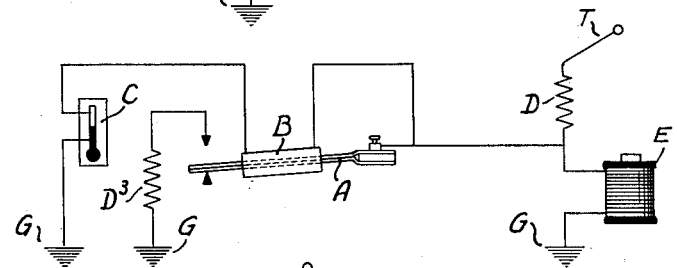
Figure 3:
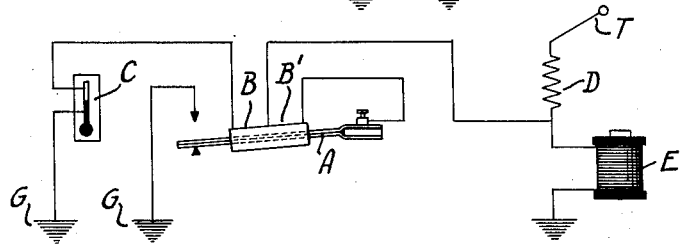
Figure 4:
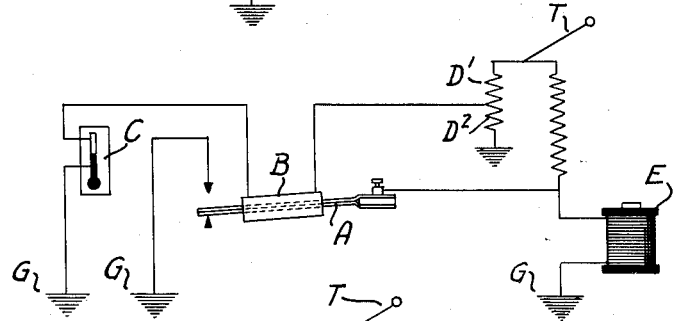
Figure 5:
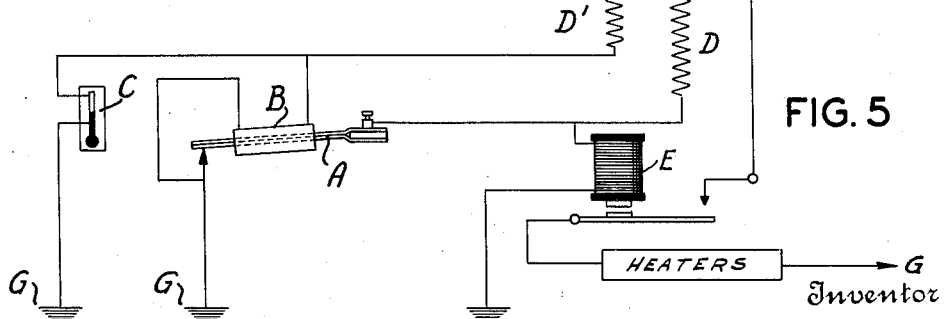

In the remaining figures of the drawing the essential operation is the same as that described above. In Fig. 2 the non-inductive resistance $D^3$ is included in the short circuit around E, but is of such low value that it does not nullify the short-circuit effect on E. In Fig. 3 the said short circuit includes, instead of the resistance $D^3$, a portion $B^1$ of the heater B. This allows the short circuit to add to the heating effect of heater B which is the position-retaining factor on the tongue A. In Fig. 4 the thermostat circuit includes, instead of resistance D, a special resistance $D^1$ which is in parallel with resistance D and is a determinal part of a resistance which includes $D^1$ and $D^2$. In Fig. 5 the magnet E acts to close a separate circuit H which passes through the controlled heaters to ground, outside of resistance D, while a special resistance $D^1$ is also included in the circuit of thermostat C. Moreover, the magnet E is normally short-circuited through tongue A which is raised by the thermal rheostat to break and depressed to close the said short circuit. In addition, the heater-relay coil B has a separate ground of its own instead of being in series with thermostat C as in the other circuits. In this case the thermostat C controls heater B, with which it is parallel, by closing or opening a short circuit around it. These several arrangements are merely illustrative of the various ways in which my thermal relay may be utilized.

What I claim as new and desire to secure by Letters Patent is:

1. In a thermal relay, a circuit including an electro-magnetic relay, a branch circuit connected with the first mentioned circuit at a position to short circuit said relay, said branch circuit including a controlling contact member constructed and arranged to move in response to temperature changes, so as to open or close the branch circuit in accordance with variations of temperature in its vicinity, a heater circuit connected with the branch circuit at a position to shunt the temperature responsive contact, said heater circuit including a heater positioned in the vicinity of said contact, and a determinating thermostat controlling the heater circuit.

2. In a thermal relay, a magnet, a relay circuit shunting said magnet and including a thermal relay provided with a temperature responsive contact member, a heater located adjacent said thermal relay, a determinating thermostat, and circuit means connecting said heater and said determinating circuit in series and so connected with the relay circuit as to shunt said temperature responsive contact member.

3. A thermal control system comprising a magnet, a relay circuit shunting said magnet and including a thermal relay provided with a temperature responsive contact member, a non-inductive resistance, a heater located adjacent said thermal relay, a determinating thermostat, and circuit means connecting said resistance, said heater and said determinating thermostat in series and so connected with the relay circuit as to shunt said temperature responsive contact.

4. A thermal control system comprising a magnet, a relay circuit shunting said magnet and including a thermal relay provided with a temperature responsive contact member, a non-inductive resistance, a heater located adjacent said thermal relay, a determinating thermostat, circuit means connecting said resistance, said heater and said determinating thermostat in series and so connected with the relay circuit as to shunt said temperature responsive contact, and a second non-inductive resistance in the thermal relay circuit.

5. A thermal control system comprising a magnet, a relay circuit shunting said magnet and including a thermal relay provided with a temperature responsive contact member, a non-inductive resistance, a heater located adjacent said thermal relay, a determinating thermostat, circuit means connecting said resistance, said heater and said determinating thermostat in series and so connected with the relay circuit as to shunt said temperature responsive contact, and a second non-inductive resistance in the thermal relay circuit and in parallel with the first mentioned resistance.

6. A thermal controlling circuit comprising a thermal switch provided with a temperature responsive member, an electric heater in the vicinity of said switch member, a determinating thermostat, a heater circuit independent of the thermally responsive member but including the heater and said determinating thermostat in series, a branch relay circuit connected with the heater circuit, and another branch circuit including said temperature responsive member, said last mentioned circuit being connected with the heater circuit at a position between the heater and the branch relay circuit.

7. A thermal controlling circuit comprising a thermal switch provided with a temperature responsive member, an electric heater in the vicinity of said switch, a determinating thermostat, a non-inductive resistance, a heater circuit independent of the temperature responsive member but including said resistance, said heater and said determinating thermostat in series, a branch relay connected with the heater circuit, and another branch circuit including said temperature responsive member, said last mentioned circuit being connected with the heater circuit at a position between the heater and the branch relay circuit.

8. A thermal controlling circuit comprising a thermal switch provided with a temperature responsive member, an electric heater in the vicinity of said switch, a determinating thermostat, a non-inductive resistance, a heater circuit including said resistance, said heater and said thermostat in series, a branch relay circuit connected with the heater circuit between said heater and said resistance, and another branch circuit including said temperature responsive member, said last mentioned circuit being connected with the heater circuit at a position between the heater and said branch relay circuit.

GEORGE E. OAKLEY.